US012809161B2

(12) United States Patent
Ominato

(10) Patent No.: US 12,809,161 B2
(45) Date of Patent: Nov. 24, 2026

(54) SCANNING OPTICAL APPARATUS

(71) Applicant: BROTHER KOGYO KABUSHIKI KAISHA, Nagoya (JP)

(72) Inventor: Hiroyuki Ominato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 126 days.

(21) Appl. No.: 18/756,478

(22) Filed: Jun. 27, 2024

(65) Prior Publication Data

US 2025/0013036 A1 Jan. 9, 2025

(30) Foreign Application Priority Data

Jul. 7, 2023 (JP) ................................ 2023-111902

(51) Int. Cl.
*G02B 26/12* (2006.01)
*B41J 2/47* (2006.01)

(52) U.S. Cl.
CPC ............ *G02B 26/127* (2013.01); *B41J 2/471* (2013.01)

(58) Field of Classification Search
CPC .. G02B 26/127; G02B 26/124; G02B 26/125; G02B 26/12; G02B 13/18; G02B 26/10; B41J 2/471; B41J 2/47; H04N 1/113
See application file for complete search history.

(56) References Cited

U.S. PATENT DOCUMENTS 6,104,522 A 8/2000 Hayashi et al.
6,198,562 B1 3/2001 Hayashi et al.
6,256,133 B1 * 7/2001 Suzuki ................. G02B 26/125 359/205.1
2002/0048072 A1 4/2002 Ishihara
2002/0131137 A1 * 9/2002 Suzuki ................. G02B 26/123 359/205.1
2004/0165241 A1 * 8/2004 Matsuoka ............ G02B 26/125 359/207.2
2011/0242633 A1 * 10/2011 Fujino .................. G02B 26/125 359/204.2
2011/0242634 A1 10/2011 Fujino et al.
2011/0317234 A1 12/2011 Ominato et al.
(Continued)

FOREIGN PATENT DOCUMENTS

JP 10-142543 A 5/1998
JP 2000-249948 A 9/2000
(Continued)

*Primary Examiner* — Balram T Parbadia
(74) *Attorney, Agent, or Firm* — Merchant & Gould P.C.

(57) ABSTRACT

A scanning optical apparatus is configured such that a first entrance surface that is an entrance surface of the first scanning lens is symmetrical in the main scanning direction, a first exit surface that is an exit surface of the first scanning lens is symmetrical in the main scanning direction, a second entrance surface that is an entrance surface of the second scanning lens is symmetrical in the main scanning direction, a second exit surface that is an exit surface of the second scanning lens is symmetrical in the main scanning direction, an optical axis of the second exit surface is shifted with respect to an optical axis of the second entrance surface in the main scanning direction, and an optical axis of the second exit surface is tilted around an axis that is perpendicular to both the main scanning direction and the optical axis of the second exit surface.

8 Claims, 9 Drawing Sheets

(56) References Cited

U.S. PATENT DOCUMENTS

| | | | | |
|---|---|---|---|---|
| 2012/0002261 | A1 * | 1/2012 | Yukawa ............... | G02B 26/125 359/204.2 |
| 2014/0071509 | A1 | 3/2014 | Fujino et al. | |

FOREIGN PATENT DOCUMENTS

| | | | |
|---|---|---|---|
| JP | 2002-48993 | A | 2/2002 |
| JP | 2011-215286 | A | 10/2011 |
| JP | 2012-8373 | A | 1/2012 |

* cited by examiner

| | | |
|---|---|---|
| WAVELENGTH | λ[nm] | 788 |
| REFRACTIVE INDEXES OF FIRST AND SECOND SCANNING LENSES | n@788nm | 1.528731 |
| RADIUS OF INSCRIBED CIRCLE OF POLYGON MIRROR | R[mm] | 10 |
| THE NUMBER OF MIRROR FACES OF POLYGON MIRROR | N | 5 |
| ANGLE OF INCIDENCE ON POLYGON MIRROR | α[deg] | 90 |
| DISTANCE FROM MIRROR FACE OF POLYGON MIRROR TO FIRST SCANNING LENS | d1[mm] | 12.3 |
| THICKNESS AT CENTER OF FIRST SCANNING LENS | d_fθ[mm] | 10 |
| DISTANCE FROM FIRST SCANNING LENS TO SECOND SCANNING LENS | d2[mm] | 73.3 |
| THICKNESS AT CENTER OF SECOND SCANNING LENS | d_CY2[mm] | 4 |
| DISTANCE FROM SECOND SCANNING LENS TO TARGET SURFACE | d3[mm] | 101.03 |
| F-THETA COEFFICIENT | k_fθ[mm] | 180 |
| MAXIMUM SCAN RANGE | [mm] | ±108 |
| PRINCIPAL PLANE RAY ANGLE (BD) | θ_bd[deg] | -46.7 |
| PRINCIPAL PLANE RAY ANGLE (SOS) | θ_sos[deg] | -34.4 |
| PRINCIPAL PLANE RAY ANGLE (COS) | θ_cos[deg] | 0.0 |
| PRINCIPAL PLANE RAY ANGLE (EOS) | θ_eos[deg] | 34.4 |
| SAGITTAL PLANE RAY AGNLE | θ_sub[deg] | 3.1 |
| DISTANCE FROM POLYGON MIRROR TO NATURAL CONVERGENT POINT | fc[mm] | ∞ |

FIG. 5

FIRST SCANNING LENS

| | FIRST SURFACE (ENTRANCE SURFACE) | SECOND SURFACE (EXIT SURFACE) |
|---|---|---|
| CENTRAL CURVATURE C | -3.076E-02 | -4.105E-02 |
| CONIC CONSTANT $k_{es}$ | -2.453E+00 | -1.364E+00 |
| 4th ORDER ASPHERICAL COEFFICIENT $a_4$ | 6.650E-06 | 1.297E-06 |
| 6th ORDER ASPHERICAL COEFFICIENT $a_6$ | -2.133E-08 | -3.436E-09 |
| 8th ORDER ASPHERICAL COEFFICIENT $a_8$ | 1.735E-12 | 2.171E-11 |
| 10th ORDER ASPHERICAL COEFFICIENT $a_{10}$ | -4.271E-13 | -5.049E-13 |
| 12th ORDER ASPHERICAL COEFFICIENT $a_{12}$ | 1.285E-15 | 1.161E-15 |
| MAIN LENS SHIFT Sy1 [mm] | -0.058 | |

FIG. 6

SECOND SCANNING LENS

| | FIRST SURFACE (ENTRANCE SURFACE) | SECOND SURFACE (EXIT SURFACE) |
|---|---|---|
| MERIDIAN CENTRAL CURVATURE $C_y$ | -2.697E-03 | -2.308E-05 |
| CONIC CONSTANT $K_{vt}$ | -1.058E+02 | 1.984E+05 |
| 4TH ORDER MERIDIAN ASPHERICAL COEFFICIENT $A_4$ | -1.186E-07 | -4.159E-07 |
| 6TH ORDER MERIDIAN ASPHERICAL COEFFICIENT $A_6$ | 6.203E-11 | 7.844E-11 |
| 8TH ORDER MERIDIAN ASPHERICAL COEFFICIENT $A_8$ | -1.071E-14 | -9.304E-15 |
| 10TH ORDER MERIDIAN ASPHERICAL COEFFICIENT $A_{10}$ | 7.400E-19 | 4.986E-19 |
| SAGITTAL CENTRAL CURVATURE $C_x$ | -1.327E-02 | -5.031E-02 |
| 2ND ORDER COEFFICIENT $B_2$ OF SAGITTAL CURVATURE FOMULA | -1.162E-04 | 6.996E-05 |
| 4TH ORDER COEFFICIENT $B_4$ OF SAGITTAL CURVATURE FOMULA | 3.722E-08 | -2.795E-08 |
| 6TH ORDER COEFFICIENT $B_6$ OF SAGITTAL CURVATURE FOMULA | 4.012E-11 | 2.089E-11 |
| 8TH ORDER COEFFICIENT $B_8$ OF SAGITTAL CURVATURE FOMULA | -2.089E-14 | -6.885E-15 |
| 10TH ORDER COEFFICIENT $B_{10}$ OF SAGITTAL CURVATURE FOMULA | 3.156E-18 | 8.497E-19 |
| PRINCIPAL LENS SHIFT Sy2 [mm] | 0.241 | |
| INTERPRINCIPAL PLANE SHIFT Sy2R [mm] | -0.400 | |
| INTERPRINCIPAL PLANE TILT Tα2R [mm] | -0.165 | |
| SUB LENS SHIFT Sx2 [mm] | 2.700 | |
| SUB LENS TILT Tβ2 [deg] | -3.500 | |

FIG. 7

SCANNING OPTICAL APPARATUS

REFERENCE TO RELATED APPLICATIONS

This application claims priority from Japanese Patent Application No. 2023-111902 filed on Jul. 7, 2023. The entire content of the priority application is incorporated herein by reference.

BACKGROUND ART

The present disclosure relates to a scanning optical apparatus, which can be used for an image forming apparatus adopting an electrophotographic imaging method.

In a scanning optical apparatus configured to scan an image surface (e.g., a surface of a photoconductor drum) with a light beam emitted from a light source and reflected by a polygon mirror, the light beam reflected by the polygon mirror is focused on the image surface. In such a scanning optical apparatus, it is known that, when a lens surface of a scanning lens is formed to be symmetrical in a main scanning direction, a curvature of field tends to be significant.

In order to overcome the above problem, according to a conventional technique, there is known a technique that the lens surface of the scanning lens is formed to be asymmetric in the main scanning direction.

SUMMARY

However, using the asymmetric surface in the main scanning direction makes it difficult to manufacture the lens and/or manage the accuracy of the lens surface, resulting in decreased productivity.

According to aspects of the present disclosure, there is provided a scanning optical apparatus, which has a light source configured to emit a beam, a polygon mirror configured to rotate around a rotation axis and deflect the beam emitted by the light source in a main scanning direction; and a scanning optical system configured to form an image of the beam deflected by the polygon mirror on an image surface, the scanning optical system including a first scanning lens and a second scanning lens located downstream of the first scanning lens in a direction where the beam proceeds. In such a scanning optical apparatus, a first entrance surface that is an entrance surface of the first scanning lens is symmetrical in the main scanning direction, a first exit surface that is an exit surface of the first scanning lens is symmetrical in the main scanning direction, a second entrance surface that is an entrance surface of the second scanning lens is symmetrical in the main scanning direction, a second exit surface that is an exit surface of the second scanning lens is symmetrical in the main scanning direction, an optical axis of the second exit surface is shifted with respect to an optical axis of the second entrance surface in the main scanning direction, and an optical axis of the second exit surface is tilted around an axis that is perpendicular to both the main scanning direction and the optical axis of the second exit surface.

In the scanning optical apparatus configured as above, the optical axis of the second exit surface is shifted with respect to the optical axis of the second entrance surface in the main scanning direction, and is tilted about an axis that is perpendicular to both the main scanning direction and the optical axis of the second exit surface, even if the second entrance surface and the second exit surface are symmetrical in the main scanning direction, it is possible to suppress the curvature of field to a small extent.

BRIEF DESCRIPTION OF DRAWINGS

FIG. 5 is a table showing an example of specifications of an optical system according to the embodiment.

FIG. 6 is a table showing an example of coefficients of a first scanning lens according to the embodiment.

FIG. 7 is a table showing an example of coefficients of a second scanning lens according to the embodiment.

DESCRIPTION

A detailed description will be given of an illustrative embodiment according to the present disclosure with reference to the accompanying drawings where necessary.

Figure 1:
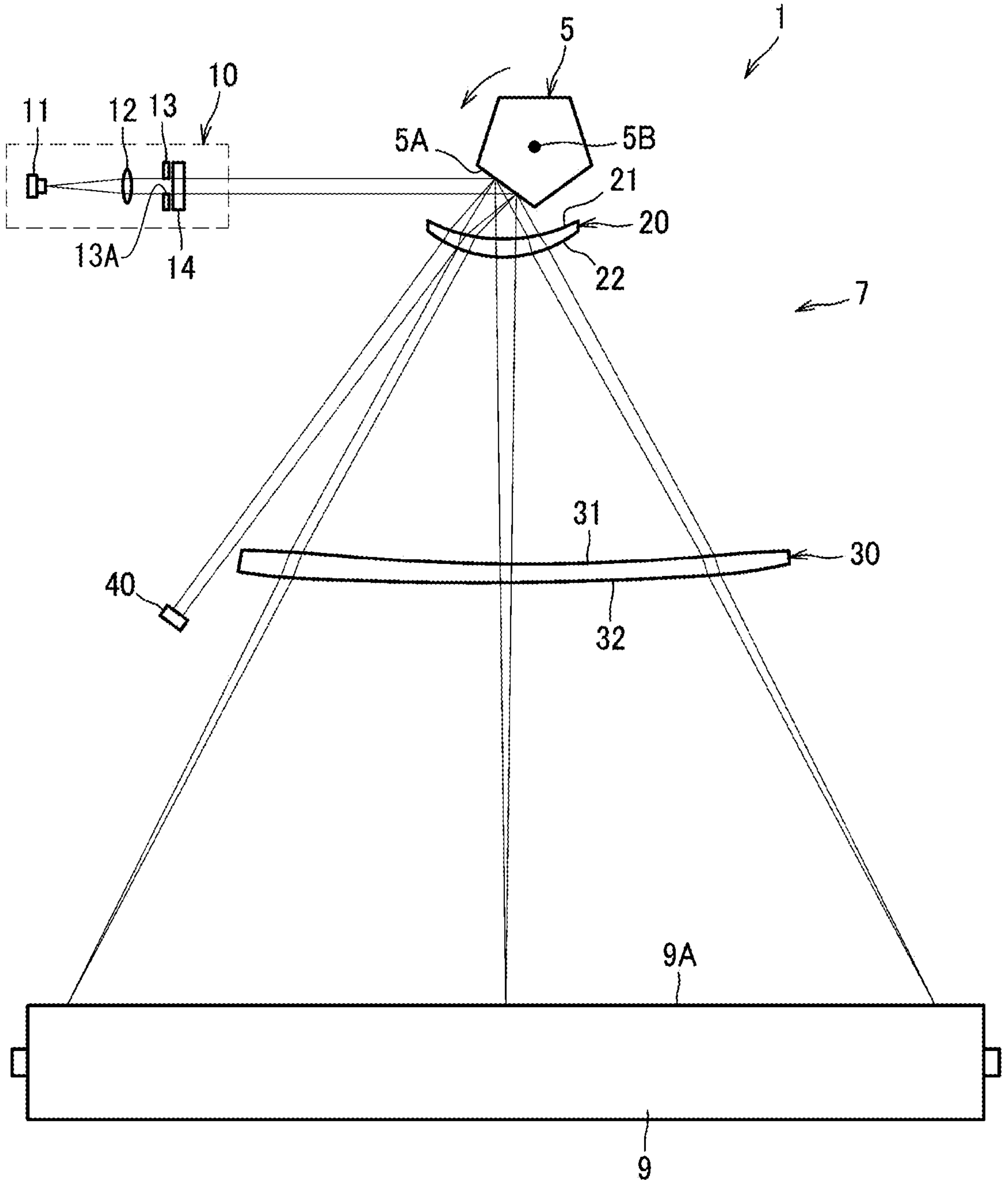
FIG. 1 is a sectional view of a scanning optical apparatus according to an embodiment taken along a main scanning plane.
Figure 2:
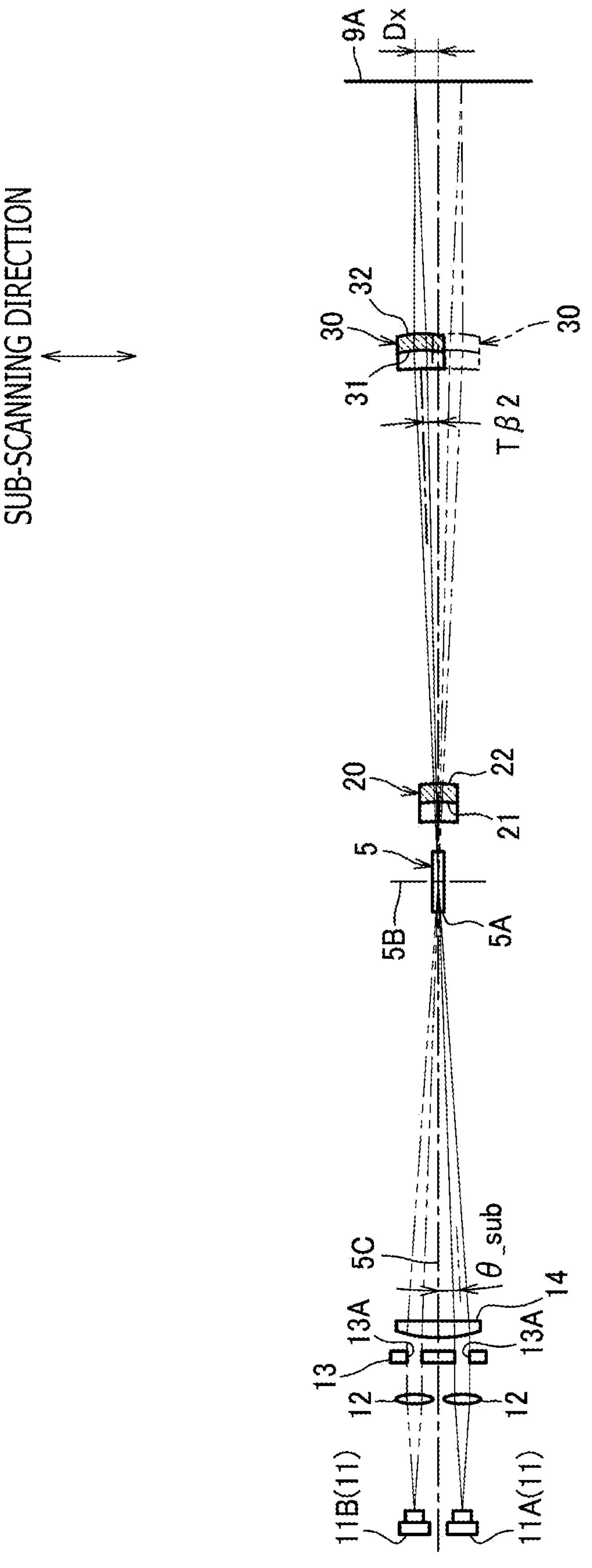
FIG. 2 is a sectional view of the scanning optical apparatus taken along a sub-scanning plane.

FIG. 1 illustrates a basic configuration of a scanning optical apparatus 1 according to an embodiment of the present disclosure. As shown in FIG. 1, the scanning optical apparatus 1 has a light emitting optical system 10, a polygon mirror 5, and a scanning optical system 7, with which a laser beam emitted by the light emitting optical system 10 is converged on an image surface 9A of a photoconductor drum 9, to form a spot-like image that scans on the image surface 9A in a main scanning direction (i.e., a direction parallel to a plane of FIG. 1). Although only one light emitting optical system 10 is shown in FIG. 1, the scanning optical apparatus 1 is provided with two light emitting optical systems 10 as shown in FIG. 2.

The light emitting optical system 10 is configured to emit the laser beam. As shown in FIG. 1, the light emitting optical system 10 includes a semiconductor laser 11, a coupling lens 12, an aperture stop 13, and a cylindrical lens 14. The semiconductor laser 11 is an example of a light source.

Optionally, the semiconductor laser 11 may be configured to have multiple light emitting points. For example, the semiconductor laser 11 may be configured such that multiple light emitting diodes are disposed in the sub-scanning direction, which is perpendicular to the plane of FIG. 1.

The coupling lens 12 is a collimating lens which is configured to convert the laser beam emitted by the semiconductor laser 11 into a parallel beam. Alternatively, the coupling lens 12 may be configured to convert the laser beam emitted by the semiconductor laser 11 into a converging beam which is converged to a finite focusing point. Further alternatively, the coupling lens 12 may be configured to convert the laser beam emitted by the semiconductor laser 11 into a diverging beam.

The aperture stop 13 is a member having an aperture 13A for regulating a diameter of a beam formed by the coupling lens 12 and proceeds toward the polygon mirror 5.

The cylindrical lens 14 is configured to converge the beam, which is emitted from the semiconductor laser 11 and passed through the coupling lens 12 and the aperture 13A in a sub-scanning direction (i.e., a direction perpendicular to the plane of FIG. 1), onto a mirror face 5A of the polygon mirror 5 to form a linear image extending in the main scanning direction.

The polygon mirror 5 has a rotation axis 5B and is configured to have multiple mirror faces 5A disposed equidistant from the rotation axis 5B. In an example shown in FIG. 1, the polygon mirror 5 has five mirror faces 5A. It is noted that the number of the mirror faces 5A of the polygon mirror 5 is not necessarily limited to five, but may be four or more than five. The polygon mirror 5 is configured to rotate around the rotation axis 5B at a constant angular speed. The polygon mirror 5 is configured to deflect, in the main scanning direction, the laser beam that is emitted from the semiconductor laser 11, passed through the coupling lens 12, the aperture stop 13 and the cylindrical lens 14. In other words, a direction in which the polygon mirror 5 deflects the beam is the main scanning direction. According to the present embodiment, the polygon mirror 5 is configured to rotate counterclockwise in FIG. 1.

The scanning optical system 7 is configured to converge the beam deflected by the polygon mirror 5 on the image surface 9A. The scanning optical system 7 includes a first scanning lens 20 and a second scanning lens 30.

The first scanning lens 20 is an f-theta (fθ) lens. That is, the first scanning lens 20 has f-theta characteristics such that the first scanning lens 20 causes the beam deflected at a constant angular velocity by the polygon mirror 5 to scan at a constant velocity on the image surface 9A. The first scanning lens 20 is also configured to converge the beam in the main scanning direction.

The second scanning lens 30 is disposed on a downstream side, in a beam travelling direction, with respect to the first scanning lens 20. The second scanning lens 30 is configured to converge the beam passed through the first scanning lens 20 on the image surface 9A to form a spot-like image. The second scanning lens 30 is configured to converge a beam mainly in the sub-scanning direction. Further, the second scanning lens 30 is configured to correct misalignment of an image forming position in the sub-scanning direction due to tilting of the mirror faces 5A of the polygon mirror 5.

The scanning optical apparatus 1 further includes a BD sensor 40. The BD sensor 40 is disposed upstream, in a rotation direction of the polygon mirror 5, with respect to the second scanning lens 30, and upstream, in the rotation direction of the polygon mirror 5, with respect to the light emitting optical system 10. The BD sensor 40 is a photosensor configured to detect a beam. For example, when the scanning optical apparatus 1 is used in a laser printer, the BD sensor is used to determine a start time for exposure of the laser beam.

In FIG. 1, the BD sensor 40 is disposed to detect a beam that has passed through the first scanning lens 20 and has not passed through the second scanning lens 30. Alternatively, the BD sensor 40 may be disposed to detect a beam that has passed through the second scanning lens 30 or that has not passed through the first scanning lens 20.

In FIG. 1, all components are shown as if they were arranged in a single plane. However, in the actual scanning optical apparatus 1, one or more mirrors, which are not shown in FIG. 1, are used to reflect the laser beam in a direction intersecting the plane of FIG. 1, and the components are offset in the direction of the rotation axis 5B of the polygon mirror 5. That is, FIG. 1 shows the optical path developed on a plane while omitting one or more mirrors. The positional relationship among the components specified in the present disclosure is thus specified based on the optical path developed on the plane while omitting mirrors.

The scanning optical apparatus 1 according to the present embodiment may be used for a color laser printer. Although only one conductor laser 11 is shown in FIG. 1, the scanning optical apparatus 1 according to the present embodiment has multiple (e.g., two) semiconductor lasers 11 as shown in FIG. 2.

Here, a center plane 5C is defined as a plane that will be referred to in the following description. The center plane 5C is orthogonal to the axial direction of the polygon mirror 5 (i.e., the sub-scanning direction), and passes through the center of the mirror faces 5A of the polygon mirror 5.

For example, the two semiconductor lasers 11 are disposed on both sides in the direction of the rotation axis 5B of the polygon mirror 5 (i.e., in the sub-scanning direction) with respect to the center plane 5C. In this configuration, two coupling lenses 12 are provided corresponding to the two semiconductor lasers 11, respectively. Further, two aperture stops 13 each having the aperture 13A are provided corresponding to the two semiconductor lasers 11, respectively. On the other hand, regarding the cylindrical lens 14, only one cylindrical lens 14 is provided for the two semiconductor lasers 11.

A semiconductor laser 11A (i.e., one of the two semiconductor lasers 11) is shifted to one side, in the sub-scanning direction, with respect to the center plane 5C (e.g., on the lower side with respect to the center plane 5C in FIG. 2). A semiconductor laser 11B (i.e., the other of the two semiconductor lasers 11) is shifted to the other side with respect to the center plane 5C in the sub-scanning direction (e.g., to the upper side with respect to the center plane 5C in FIG. 2).

In FIG. 2, the laser beam emitted from the semiconductor laser 11A is refracted upward by the coupling lens 12 as shown by the solid lines in FIG. 2, and enters the mirror face 5A of the polygon mirror 5. The beam reflected by the mirror face 5A then proceeds to the other side of the center plane 5C, i.e., to the upper side. The laser beam emitted from the semiconductor laser 11B is refracted downward by the coupling lens 12 and enters the mirror face 5A of the polygon mirror 5, as shown by the double-dashed lines in FIG. 2. The beam reflected by the mirror face 5A then proceeds to the other side of the center plane 5C, i.e., to the lower side. That is, the beam from the semiconductor laser 11A enters the mirror face 5A of the polygon mirror 5 at an angle θ_sub (i.e., a sub-scanning plane ray angle) with respect to the center plane 5C. Similarly, the beam from the semiconductor laser 11B enters the mirror face 5A of the polygon mirror 5 at an angle −θ_sub (i.e., the sub-scanning plane ray angle) with respect to the center plane 5C.

The semiconductor laser 11A and the semiconductor laser 11B are used to form images of different colors. By equipping two sets of semiconductor lasers 11A and 11B (i.e., four semiconductor lasers), the scanning optical apparatus 1 is capable of performing exposure for forming four-color images.

The first scanning lens 20 is configured with a single lens into which both the beam from the semiconductor laser 11A and the beam from the semiconductor laser 11B enter. The second scanning lens 30 is configured with two separate lenses, one for the beam from the semiconductor laser 11A and the other for the beam from the semiconductor laser 11B. In FIG. 2, the two second scanning lenses 30 are shown overlapping, but in an actual configuration, the beam from the semiconductor laser 11A and the beam from the semiconductor laser 11B are sufficiently separated by mirrors, which are not shown in the figure, so the two second scanning lenses 30 do not interfere with each other. The laser beams passing through the first scanning lens 20 and the second scanning lenses 30 form images on the image surface 9A at opposite positions with respect to the center plane 5C, each position being away from the center plane 5C by a distance Dx in the sub-scanning direction.

Figure 3:
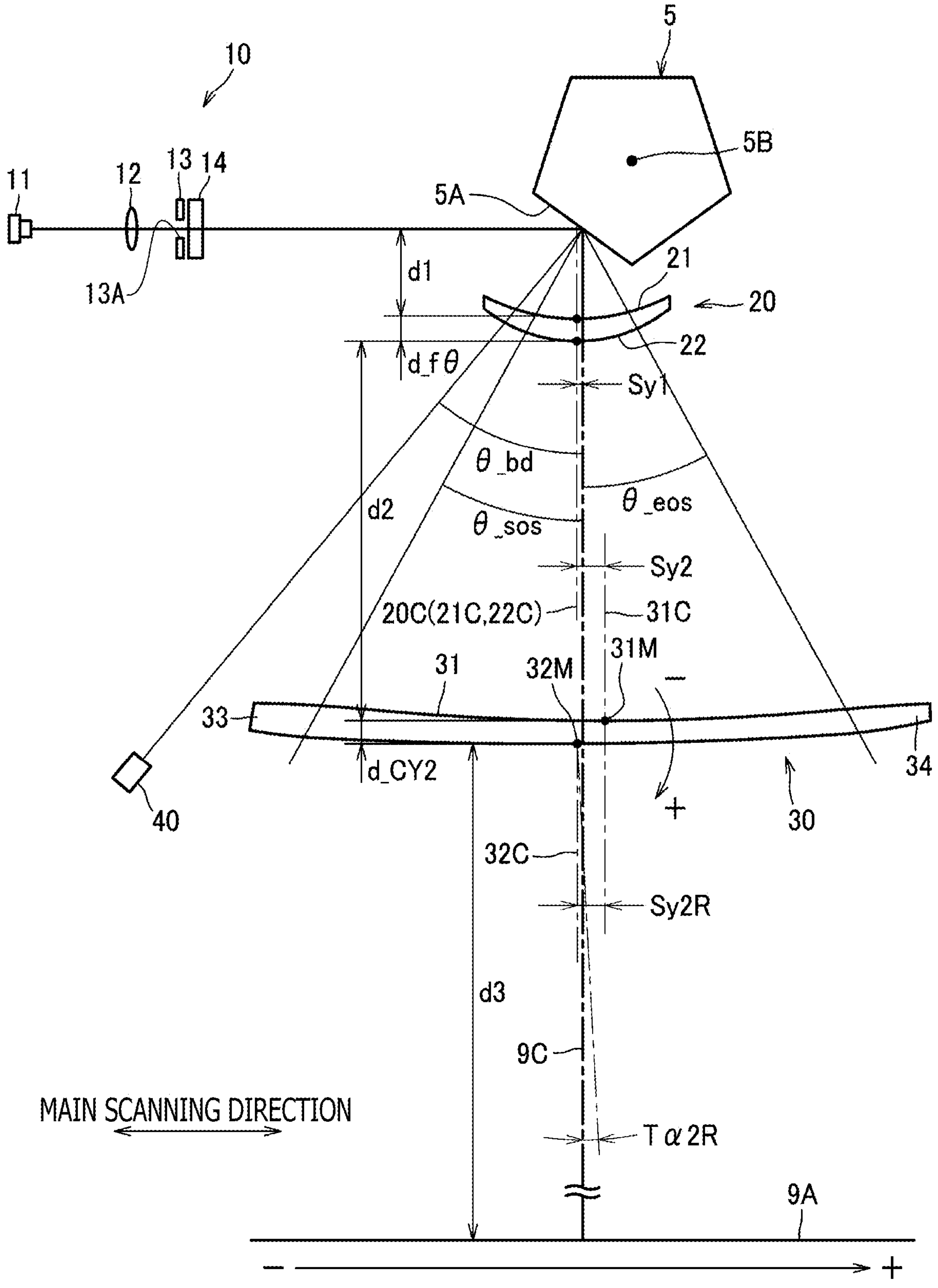
FIG. 3 shows shift and tilt of lens surfaces of the scanning optical apparatus in the main scanning plane.

Hereinafter, referring to FIG. 3 and FIG. 4, the details of the first scanning lens 20 and the second scanning lenses 30 will be described.

The first scanning lens 20 has a first entrance surface 21 through which a beam enters and a first exit surface 22 through which a beam is emitted. The first entrance surface 21 has a symmetrical shape in the main scanning direction. The first exit surface 22 has a symmetrical shape in the main scanning direction. An optical axis 22C of the first exit surface 22 coincides with an optical axis 21C of the first entrance surface 21. In the following description, an optical axis 20C of the first scanning lens 20 is also referred to. The optical axis 20 is identical to the optical axis 21C and the optical axis 22C. It is noted that the "optical axis" is an "axis of symmetry" of the lens surface and is an "aspheric axis." Thus, the optical axis 21C is the axis of symmetry of the entrance surface 21, while the optical axis 22C is the axis of symmetry of the exit surface 22.

The first entrance surface 21 and the first exit surface 22 are even-order aspherical surfaces that are axisymmetric with respect to their optical axes 21C and 22C, respectively. Concretely, each of the first entrance surface 21 and the first exit surface 22 is configured such that, when a conic constant is kes, a curvature at vertex is C, 4th to 12th aspheric coefficients are α4, α6, α8, α10 and α12, then a sag amount at distance r from the optical axis 21C or 22C is expressed by equation (1) below.

$$z=\frac{Cr^2}{1+\sqrt{1-(1+k_{es})C^2r^2}}+\alpha_4r^4+\alpha_6r^6+\alpha_8r^8+\alpha_{10}r^{10}+\alpha_{12}r^{12} \quad (1)$$

The optical axis 20C of the first scanning lens 20 is shifted in the main scanning direction with respect to a scanning centerline 9C. The scanning centerline 9C represents a center of a beam reflected by the polygon mirror 5 and incident on the first scanning lens 20 at an angle of incidence of 0 degrees. Concretely, the optical axis 20C of the first scanning lens 20 is shifted from the rotation axis 5B of the polygon mirror 5 in the main scanning direction with respect to the scanning centerline 9C by Sy1 in the main scanning direction. It should be noted that the optical axis 20C of the first scanning lens 20 is also the optical axis 21C of the first entrance surface 21 and a optical axis 22C of the first exit surface 22.

The second scanning lens 30 has a second entrance surface 31 on which a beam is incident and a second exit surface 32 through which a beam is emitted. The second scanning lens 30 has a first end portion 33 farther from the rotation axis 5B of the polygon mirror 5 and a second end portion 34 closer to the rotation axis 5B of the polygon mirror 5 as the end portions in the main scanning direction.

The second entrance surface 31 has a shape symmetrical in the main scanning direction. Concretely, the second entrance surface 31 is symmetrical in the main scanning direction with respect to the sub-scanning plane including an optical axis 31C. In other words, the optical axis 31C is an axis of symmetry of the second entrance surface 31. Further, the second exit surface 32 has a shape symmetrical in the main scanning direction. Concretely, the second exit surface 32 is symmetrical in the main scanning direction with respect to the sub-scanning plate including an optical axis 32C. In other words, the optical axis 32C is an axis of symmetry of the second exit surface 32C. The second entrance surface 31 and the second exit surface 32 are aspherical in the main scanning direction. The curvatures of the second entrance surface 31 and the second exit surface 32 in the sub-scanning direction vary continuously and symmetrically from the respective optical axis 31C and 32C outwardly in the main scanning direction, respectively. The second entrance surface 31 and the second exit surface 32 are deformed toric surfaces. Concretely, each of the second entrance surface 31 and the second exit surface 32 is configured such that, when, in the generatrix direction, a conic constant is Kvt, a curvature at vertex is C, and 4th to 10th aspherical coefficients are A4, A6, A8, A10, then a sag amount z in the generatrix direction at a coordinate y in the main scanning direction is expressed by equation (2) below.

$$z=\frac{C_yy^2}{1+\sqrt{1-(1+K_{vt})C_y^2y^2}}+A_4y^4+A_6y^6+A_8y^8+A_{10}y^{10} \quad (2)$$

Further, for the second entrance surface 31 and the second exit surface 32, a sag amount s in the directrix direction at a coordinate x in the sub-scanning direction is expressed by equation (3) below.

$$s=\frac{x^2/r'}{1+\sqrt{1-(x/r')^2}} \quad (3)$$

In equation (3), a radius of curvature r' in the sub-scanning direction at a coordinate y in the main scanning direction of the second entrance surface 31 and the second exit surface 32 is expressed in equation (4) below, with the curvature at vertex in the directrix direction as Cx and B2, B4, . . . , B10 as coefficients determined for the second entrance surface 31 and the second exit surface 32, respectively.

$$r'=\frac{1}{C_x}\left(1+B_2y^2+B_4y^4+B_6y^6+B_8y^8+B_{10}y^{10}\right) \quad (4)$$

However, the forms of expression of the second entrance surface 31 and the second exit surface 32 are not necessarily limited to the above equations.

The optical axis 31C of the second entrance surface 31 is shifted in the main scanning direction relative to the optical axis 22C of the first exit surface 22. Concretely, the optical axis 31C of the second entrance surface 31 is shifted from the optical axis 22C of the first exit surface 22, in the main scanning direction, toward the side closer to the rotation axis 5B of the polygon mirror 5 by Sy2. The optical axis 31C of the second entrance surface 31 is located closer to the rotation axis 5B of the polygon mirror 5 with respect to the scanning centerline 9C.

The optical axis 32C of the second exit surface 32 is shifted relative to the optical axis 31C of the second entrance surface 31 in the main scanning direction. Concretely, the optical axis 32C of the second exit surface 32 is shifted relative to the optical axis 31C of the second entrance surface 31 by Sy2R in the main scanning direction toward the side farther from the rotation axis 5B of the polygon mirror 5. The optical axis 32C of the second exit surface 32 is on the farther side from the rotation axis 5B of the polygon mirror 5 with respect to the scanning centerline 9C.

The optical axis 32C of the second exit surface 32 is tilted with respect to the optical axis 31C of the second entrance surface 31 about an axis orthogonal to both the main scanning direction and the optical axis 32C of the second exit surface 32 (i.e., about a point 32M in the drawings). Concretely, the optical axis 32C of the second exit surface 32 is tilted with respect to the optical axis 31C of the second entrance surface 31 by Tα2R so that the first end portion 33 is farther from the rotation axis 5B.

Figure 4:
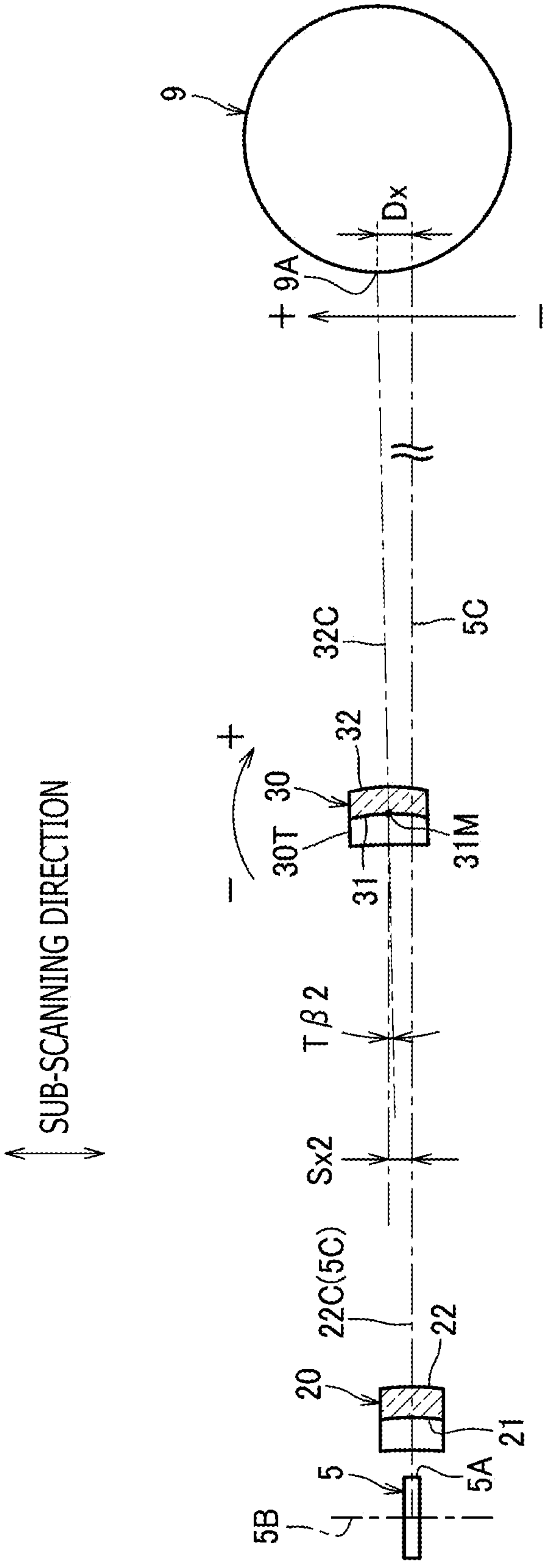
FIG. 4 shows shift and tilt of lens surfaces of the scanning optical apparatus in the sub-scanning plane.

As shown in FIG. 4, the optical axis 22C of the first exit surface 22 coincides with the center plane 5C in the sub-scanning direction. The center 31M of the second entrance surface 31 is shifted by Sx2 toward the other side in the sub-scanning direction with respect to the optical axis 22C of the first exit surface 22. The other side of the sub-scanning direction here is the opposite side across the center plane 5C from the side where the semiconductor laser 11 (i.e., the semiconductor laser 11A in the example shown in FIG. 4) that emits the light beam passing through the second scanning lens 30 is located.

The optical axis 31C of the second entrance surface is tilted with respect to the center plane 5C, which is perpendicular to the axial direction of the polygon mirror 5, so that the other end portion, in the sub-scanning direction, of the second scanning lens 30 is closer to the polygon mirror 5. In FIG. 4, the other end portion, in the sub-scanning direction, of the second scanning lens 30 is an upper end portion 30T. The second scanning lens 30 is tilted counterclockwise (i.e., in a direction from a symbol "–" toward a symbol "+" shown in FIG. 4), so that the upper end portion 30T approaches the polygon mirror 5.

In the scanning optical apparatus 1 described above, the optical axis 32C of the second exit surface 32 is shifted with respect to the optical axis 31C of the second entrance surface 31 in the main scanning direction, and is tilted about an axis that is perpendicular to both the main scanning direction and the optical axis 32C of the second exit surface 32. According to this configuration, even if the second entrance surface 31 and the second exit surface 32 are symmetrical in the main scanning direction, it is possible to suppress the curvature of field to a small extent.

Further, the second entrance surface 31 and the second exit surface 32 are symmetrical in the main scanning direction. According to this configuration, manufacturing of the lens and management of its accuracy are easier, and productivity can be improved. In addition, the first entrance surface 21 has an axisymmetric shape, which makes it easy to manufacture.

The inventor has confirmed that the scanning optical apparatus 1 described in the embodiment can achieve a desired optical performance. In the process of confirmation, the specifications of the scanning optical apparatus 1 were as indicated in FIG. 5. The locations indicated by the dimensions and angles in FIG. 5 are shown in FIGS. 2 and 3. In table 5, SOS means Start of Scan and corresponds to the starting end of the effective scanning area, COS means Center of Scan and corresponds to a center of the effective scanning area, and EOS means End of Scan and corresponds to end of an effective scanning range. Further, the first scanning lens (first scanning lens) 20 was a lens surface represented by the aforementioned equation (1), and each coefficient was set to the values shown in FIG. 6. The amount of shift and tilt of the first entrance surface 21 and those of the first exit surface 22 were the values shown in FIG. 6. The positive and negative directions of shift and tilt were as shown in FIG. 3 and FIG. 4.

The second scanning lens 30 was a lens having surfaces represented by equations (2) and (3) described above, respectively, and the respective coefficients of equations (1) and (2) were the values shown in FIG. 7. The amount of shift and tilt of the second entrance surface 31 and those of the second exit surface 32 were set to the values shown in FIG. 7.

Figure 8:
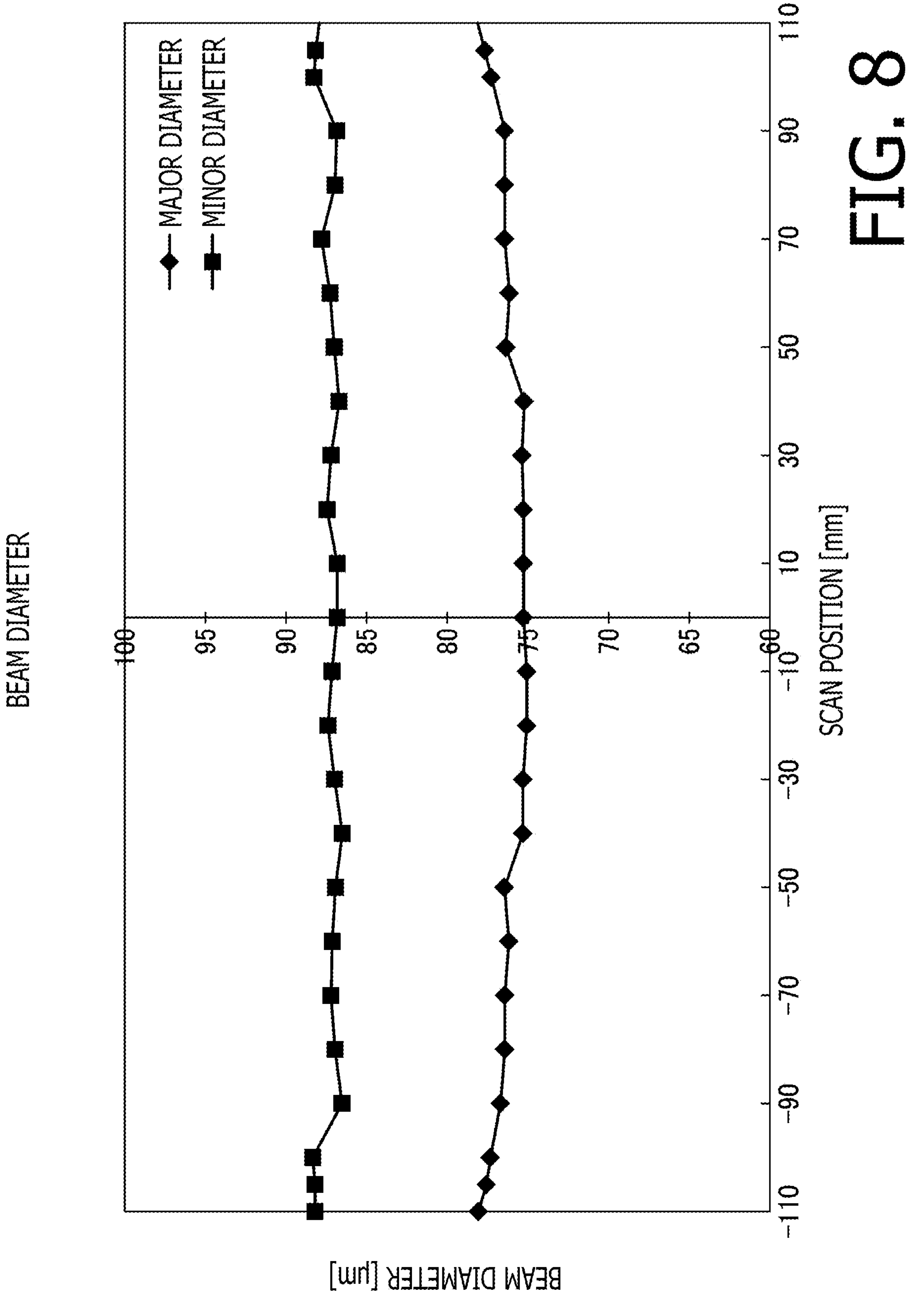
FIG. 8 shows a graph plotting calculation results of a beam diameter on an image surface according to the embodiment.
Figure 9:
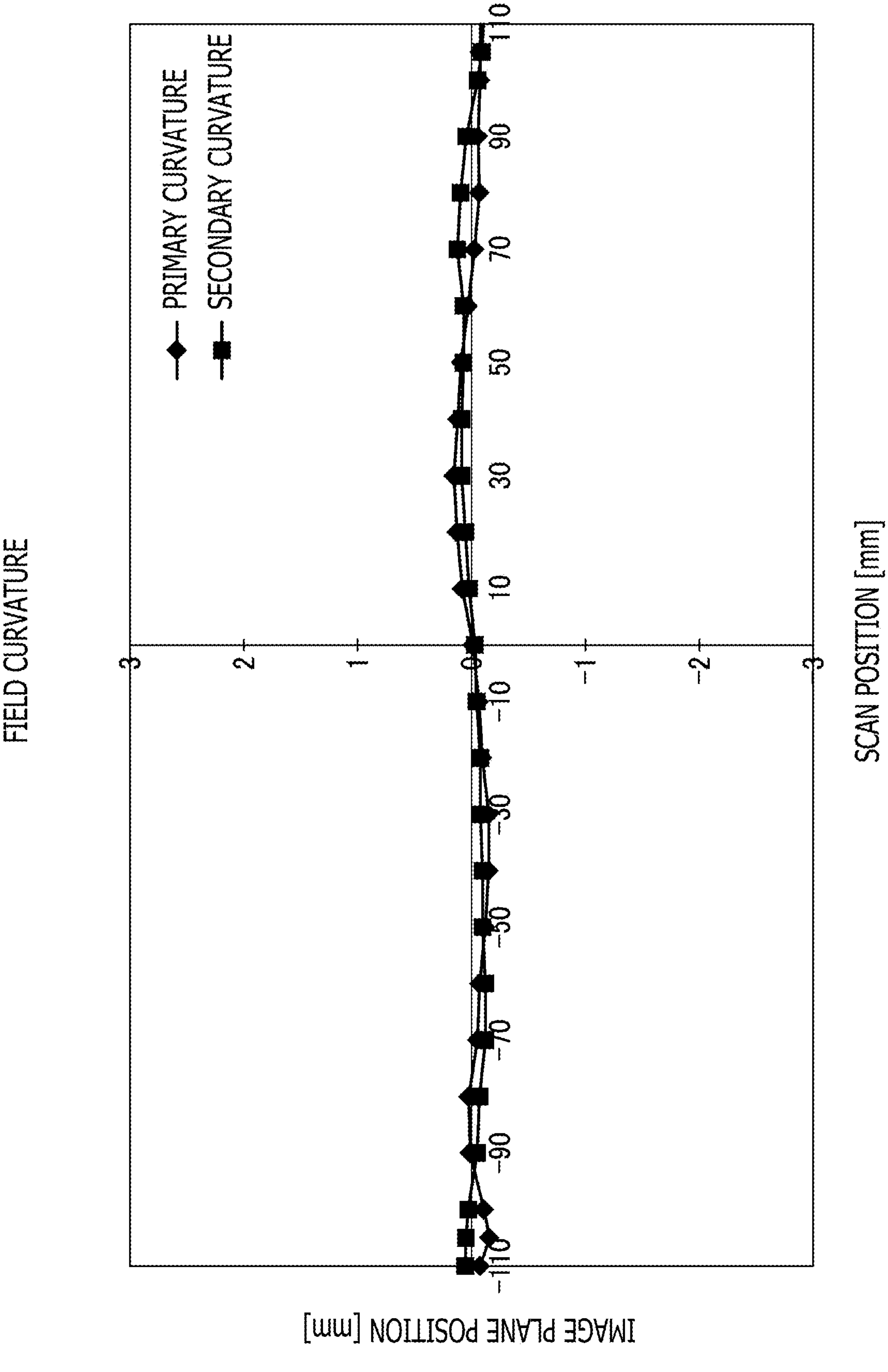
FIG. 9 shows a graph plotting calculation results of curvature of image according to the embodiment.

An optical analysis of the image formation state at the image surface 9A under the conditions described above shows that the beam diameter in the main scanning direction is less than 80 μm over the entire scanning range from one end to the other, as shown in FIG. 8. The beam diameter in the sub-scanning direction (sub-diameter) is less than 100 μm over the entire scanning range from one end to the other. As shown in FIG. 9, the curvature of field is less than ±0.2 mm from one end of the scanning range to the other for both the main scanning direction (i.e., the main curvature) and the sub-scanning direction (i.e., the sub-curvature).

It should be noted that aspects of the present disclosure are not necessarily limited to the embodiment described above, but the configuration may be modified in various ways without departing from aspects of the present disclosure.

What is claimed is:

1. A scanning optical apparatus, comprising:

a light source configured to emit a beam;

a polygon mirror configured to rotate around a rotation axis and deflect the beam emitted by the light source in a main scanning direction; and a scanning optical system configured to form an image of the beam deflected by the polygon mirror on an image surface, the scanning optical system including a first scanning lens and a second scanning lens located downstream of the first scanning lens in a direction where the beam proceeds, wherein:

a first entrance surface that is an entrance surface of the first scanning lens is symmetrical in the main scanning direction, a first exit surface that is an exit surface of the first scanning lens is symmetrical in the main scanning direction, a second entrance surface that is an entrance surface of the second scanning lens is symmetrical in the main scanning direction, a second exit surface that is an exit surface of the second scanning lens is symmetrical in the main scanning direction, an axis of symmetry of the second exit surface is shifted with respect to an axis of symmetry of the second entrance surface in the main scanning direction, and the axis of symmetry of the second exit surface is tilted around an axis that is perpendicular to both the main scanning direction and the axis of symmetry of the second exit surface.

2. The scanning optical apparatus according to claim 1, wherein the axis of symmetry of the second exit surface is shifted, relative to the axis of symmetry of the second entrance surface, in the main scanning direction to the side far from the rotation axis of the polygon mirror.

3. The scanning optical apparatus according to claim 1, wherein:

the second scanning lens has a first end portion that is far from the rotation axis of the polygon mirror and a second end portion that is close to the rotation axis of the polygon mirror as end portions in the main scanning direction; and the axis of symmetry of the second exit surface is tilted with respect to the axis of symmetry of the second entrance surface so that the first end portion is away from the rotation axis of the polygon mirror.

4. The scanning optical apparatus according to claim 1, wherein the axis of symmetry of the second entrance surface is shifted relative to the axis of symmetry of the first exit surface in the main scanning direction toward a side closer to the rotation axis of the polygon mirror.

5. The scanning optical apparatus according to claim 1, wherein:

the first entrance surface is an axisymmetric aspheric surface; and the first exit surface is an axisymmetric aspheric surface.

6. The scanning optical apparatus according to claim 1, wherein:

each of the second entrance surface and the second exit surface is a deformed toric surface which is configured such that, when a conic constant is Kvt, a curvature at vertex is C, and 4th to 10th aspherical coefficients are A4, A6, A8, A10, a sag amount in the generatrix direction at a coordinate y in the main scanning direction is expressed by equation (1)

$$z = \frac{C_y y^2}{1 + \sqrt{1 - (1 + K_{vt}) C_y^2 y^2}} + A_4 y^4 + A_6 y^6 + A_8 y^8 + A_{10} y^{10}; \quad (1)$$

and each of the second entrance surface and the second exit surface is configured such that a sag amount s in the directrix direction at a coordinate x in the sub-scanning direction is expressed by equation (2)

$$s = \frac{x^2/r'}{1 + \sqrt{1 - (x/r')^2}}, \quad (2)$$

and wherein, in equation (2), a radius of curvature r' in the sub-scanning direction at coordinate y in the main scanning direction of the second entrance surface and the second exit surface is expressed in equation (3), $$r' = \frac{1}{C_x}\left(1 + B_2 y^2 + B_4 y^4 + B_6 y^6 + B_8 y^8 + B_{10} y^{10}\right), \quad (3)$$

with the curvature at vertex in the directrix direction as Cx and B2, B4, . . . , and B10 as coefficients determined for the second entrance surface and the second exit surface, respectively.

7. The scanning optical apparatus according to claim 1, wherein:

the light source is shifted to one side, in the sub-scanning direction, relative to the center of the mirror surface of the polygon mirror;

the beam from the light source enters the mirror face of the polygon mirror at an angle to a plane perpendicular to the axial direction of the polygon mirror; and the axis of symmetry of the second entrance surface is shifted to the other side, in the sub-scanning direction, relative to the axis of symmetry of the first exit surface.

8. The scanning optical apparatus according to claim 7, wherein the axis of symmetry of the second entrance surface is tilted so that the other end of the second scanning lens in the sub-scanning direction is closer to the polygon mirror with respect to a plane perpendicular to the axial direction of the polygon mirror.

* * * * *